Jan. 22, 1952   E. H. GETZ   2,583,170
DENTAL TRAY
Filed June 7, 1949
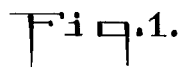
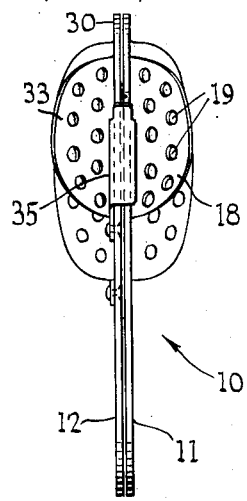
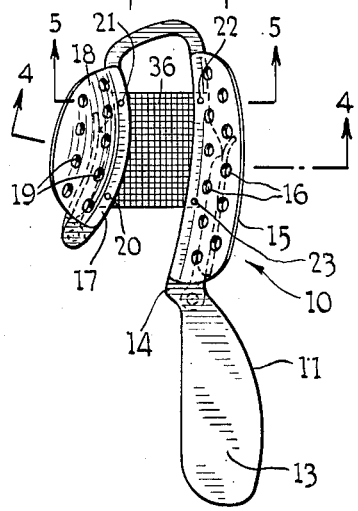
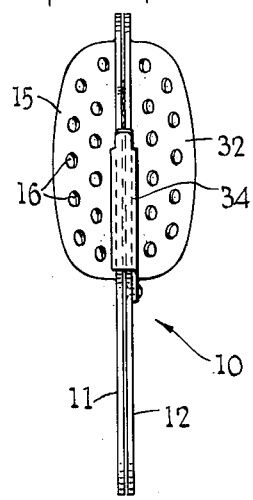
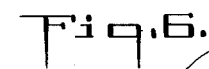
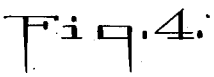
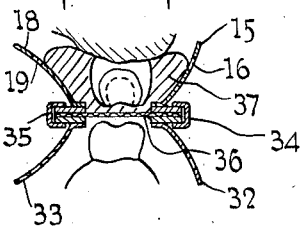
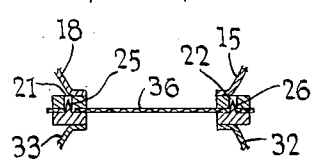
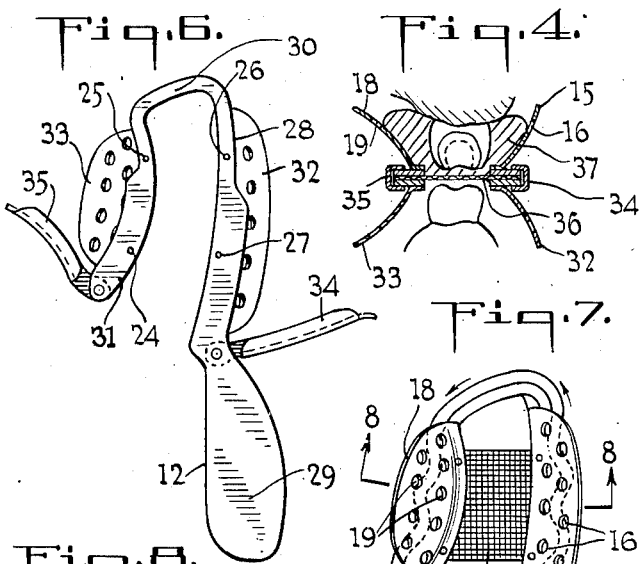
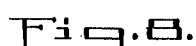
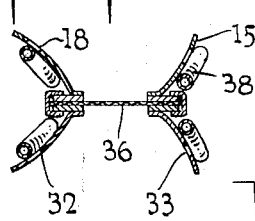
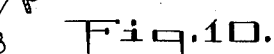
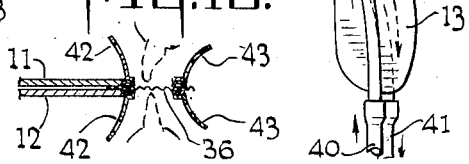
INVENTOR.
EDWIN H. GETZ
BY
Dicke + Padlon
ATTORNEY Patented Jan. 22, 1952

2,583,170

UNITED STATES PATENT OFFICE 2,583,170

DENTAL TRAY

Edwin H. Getz, Forest Hills, N. Y.

Application June 7, 1949, Serial No. 97,591

12 Claims. (Cl. 32—19)

This invention relates to a dental tray and more particularly to a dental impression tray for obtaining the bite or true relationship in closure of the opposing teeth in any given pre-molar and/or molar section of the dental arch, at the same time that an impression is obtained of the preparations for inlay, crown or bridge or any combination of these restorations.

It is an object of the present invention to provide an easily manipulatable dental impression tray consisting of complementary sections adapted to retain a foraminous or reticulated layer between the complementary sections and impression material to permit the taking of impressions of teeth in the mouth preparatory to their restoration.

Another object of the present invention is to provide a dental tray of relatively simple, economical construction which could be readily and easily handled and used in connection with dental restorations.

Still another object of the present invention is to provide a dental impression tray made preferably of metal and having perforated retaining walls adjacent each side of the dental arches of the mouth and adapted to readily retain the impression material thereon when used in the mouth.

Still another object of the present invention is to provide a manually operated tray for taking dental impressions adapted to retain an impression material and to cool the same thereon.

A more specific object of the present invention is to provide a dental impression tray of an upper and lower complementary section each having a perforated retaining walls for holding thereon an impression material, a handle for each section, a connecting bar between the walls of each section and reticulated means retainable by the sections.

Other objects and features of the present invention will become apparent from the hereinafter detailed description taken in connection with the accompanying drawings in which:

Fig. 1 is a top plan view of a preferred embodiment of the invention;

Fig. 2 is a left side view of Fig. 1, showing the complementary sections joined together;

Fig. 3 is a right side view of Fig. 1;

Fig. 4 is a cross sectional view taken on line 4—4 of Fig. 1;

Fig. 5 is a cross sectional view of line 5—5 of Fig. 1;

Fig. 6 is a top plan view of the lower half of the embodiment shown in Fig. 1;

Fig. 7 is a top plan view of a modification of the embodiment shown in Fig. 1;

Fig. 8 is a cross sectional view taken on line 8—8 of Fig. 7;

Fig. 9 is a plan view of another modification of the embodiment shown in Fig. 1, showing the application of the embodiment to the anterior portion of the dental arch, and Fig. 10 is a sectional view taken on line 10—10 of Fig. 9.

Referring now to the drawings in which like numbers refer to like parts throughout, There is provided a tray 10, consisting of two complementary halves or sections 11 and 12 respectively, each being of corresponding shape, one a lower section and the other an upper section. The upper section 11 contains a handle member 13 and an extending portion or bar 14, from which extends an upwardly inclined member or retaining wall 15, which is provided with spaced openings or perforations 16, and which wall is known as the buccal or labial retaining wall. It will be noted that this wall extends outwardly and toward the inner cheek of the mouth when in use so as to retain the impression material to be used in connection with the device herein being described.

Said bar member 14 continues from the buccal retaining wall area and is so bent as to form a distal connecting bar 15, which passes distal to the last tooth or teeth of the dental arch or wherever clearance of the teeth in the mouth is to be obtained by the user of the tray. Said bar 15 is then bent toward the handle member 13 but in spaced relation relative thereto and forming a terminal section 17 following the general contour of bar 14. It will be noted that the curvature of said terminal portion 17 is such that it follows the outline of the lingual side of the dental arch and is provided with an upwardly and outwardly extending member or retaining wall 18, also known as a lingual retaining wall, and which contains spaced openings or perforations 19.

The bar 14 to 17 of said upper section is provided with a plurality of spaced openings located at 20, 21, 22 and 23 respectively for accommodating holding pins 24, 25, 26 and 27 respectively on the curved bar member 28, of the lower section 12. It will be noted that said lower section 12 corresponds in shape and outline with that of the upper section and is provided with a handle 29 extending from member 28 which is bent at the distal portion 30 and has a continuing lingual section 31. Said lower section is provided with perforated retaining buccal and lingual walls 32 and 33 respectively corresponding in shape, size and appearance with the respective buccal and lingual walls 15 and 18. Said section is also provided with fastening or clip members 34 and 35 respectively, clip 34 being pivotally connected to the handle 29, and clip 35 to the end of the lingual bar member 31 as shown more clearly in Fig. 6 of the drawings. Said fastening members 34 and 35 are preferably of channel shape and are adapted to hold the sections tightly together. It will be noted that said pins 24, 25, 26, and 27 on lower section 12 are adapted to retain a piece of reticulated material, such as a gauze 36, in a relatively taut position when the upper and lower sections are connected as shown in Figs. 1 to 3 inclusive. Said gauze 36 is adapted to support a suitable hydrocolloid, as an alginate or other impression material 37, shown in Fig. 4 used in the dental art for the preparation of restorations. Furthermore, such material facilitates the taking of the impression of the teeth to be restored as is more clearly shown in Fig. 4 of the drawings.

The retaining buccal and lingual walls of each section, it will be noted, are perforated to facilitate the yielding of the impression material during its use in the device shown and at the same time permit some of said impression material to pass through the openings in said retaining walls and to permit the rapid formation of the dental impression.

There is shown in Figs. 7 and 8, a modification of the embodiment shown in Figs. 1 to 6 inclusive. This modification as shown is of substantially the same construction as that shown in Figs. 1 to 6 inclusive. However, there is added a water cooling system consisting of a water carrying conduit 38 extending along the top of handle 13 of the upper section 11 and which continues therefrom in a snake-like fashion along the outside of the retaining walls 15 and 18 and curving over at 39 to the outside of the lower retaining walls 32 and 33 and then to the face of handle 29 of the lower section 12. By this device, the cooling of the impression material is accelerated and can be easily connected in any suitable manner by means of tubular connection 40 and 41 to a source of water supply.

In the embodiment shown in Figs. 7 and 8, the upper and lower sections 11 and 12 are relatively fixed because of the conduit, but they are easily movable or they may be easily disconnected by the use of a piece of flexible tubing at 39, connecting the conduit of the upper section with the conduit of the lower section.

In Figs. 9 and 10, there is shown another modification of my invention showing its application to the teeth in the anterior portion of the upper and lower dental arches. Said modification is provided with an upper and lower complementary section each having a frontal and posterior perforated retaining walls 42 and 43 respectively. Each section is provided with extending spaced tubular members 44 and 45 leading from the respective ends of the retaining walls 42 and 43. Such members are adapted to accommodate slidable collar members 46 and 47 respectively which can be adjusted relatively of said tubular members in order to permit proper adjustment depending upon the number of teeth in the dental arch of the mouth and to establish a firm foundation for the taking of an impression of the teeth in the anterior portion of the dental arch.

It will be noted from the foregoing description taken in connection with the accompanying drawings, that I have provided a relatively simple, highly effective dental tray for obtaining the proper relationship of the upper and lower dental arch at the same time that an impression is made for dental restorations. This type of tray may be made preferably of metal or other suitable material that may facilitate the cooling of the impression material when used in connection with the device as shown.

While preferred embodiments of the invention have been shown and described, it is understood that modifications as to the arrangement and use of parts and of materials may be made without departing from the spirit and scope of the invention as claimed herein.

I claim:

1. A dental impression tray for the upper and lower dental arch of the mouth comprising a plurality of disconnectible complementary halves, each half having a handle member and a bar extending therefrom each of said handle members and bars being adapted to lie relatively and respectively flush with each other, a buccal and a lingual retaining wall respectively, each mounted on each bar of each half and spaced from each other, and adapted to be adjacent the respective sides of the dental arch, a reticulated member retained by said halves intermediate the retaining walls, and means on each side of one of the halves for clasping the halves firmly together.

2. A dental impression tray, comprising a pair of complementary disconnectible lower and upper sections of conforming and corresponding outline, each of said sections having an elongated bar of such shape as to conform with the outline of the dental arch, a perforated retaining wall on said bar adapted to fit against one side of the arch, a distal connecting member extending from the bar, and a lingual member on the distal member, said lingual member having a perforated retaining wall in spaced relation to the other perforated wall for holding impressionable material therebetween, a reticulated member between said sections, a handle extending from the elongated bar of each section, and clamping means on one of the sections adapted to retain the sections together.

3. A dental impression tray for containing impressionable material comprising a pair of disconnectible upper and lower complementary sections adapted to fit around the dental arch of the mouth, each section having a handle, a bar extending from the handle adapted to follow the contour of the dental arch and extending around the end of the arch and to the other side of the arch, perforated walls extending upwardly of one bar and downwardly of the other bar the bar extending along side of the arch on each side adapted to contain impressionable material therebetween, a reticulated member intermediate the sections and between the walls thereof for said material, and means on the bar of one of the sections adapted to clip both sections together.

4. A dental impression tray for taking a simultaneous impression and bite of the upper and lower dental arch comprising a pair of complementary disconnectible lower and upper sections of corresponding outline, adapted to fit around the dental arch of the mouth, each of said sections having an elonagted member, a buccal, perforated retaining wall extending upwardly and downwardly of said elongated member, a distal connecting member in spaced connection with the elongated member and a lingual member on said elongated member in connection with the distal member, said lingual member having a perforated retaining wall extending upwardly and downwardly of the elongated member, means on one of the sections to retain a recticulated member intermediate the buccal and lingual walls, a handle extending from the elongated member of each section, means on one of the sections adapted to retain the sections together, and water conducting cooling means extending through each section.

5. A dental impression tray comprising a pair of complementary disconnectible sections of corresponding outline, each of said sections having an elongated member adapted to follow the general outline of the dental arch of the mouth and having a perforated retaining wall extending respectively upwardly and downwardly thereof, one on the lingual side and another on the buccal side, a distal connecting member in connection with the elongated member, a handle extending from the elongated member of each section, and means on one of the sections adapted to retain the sections together.

6. A tray according to claim 5, in which each section is provided with a tubular bar member and a member slidable in and out of said bar member, said bar members following the outline of the dental arch of the mouth and being relatively adjustable with respect to said arch.

7. A dental impression tray for using a hydrocolloid gum comprising a pair of disconnectible complementary lower and upper sections adapted to be placed between the upper and lower dental arch of the mouth, means in each section corresponding with the outline of the dental arch each of said sections having perforated retaining walls for accommodating a hydrocolloid gum, said retaining walls being disposed, one on the side against the interior of the arch and the other on the outside of the arch, spaced retaining means on one of the sections for a reticulated member placed intermediate the sections and between the retaining walls, a handle extending from the first named means, and fastening means on one of the sections adapted to retain the sections together.

8. A tray according to claim 7 in which the exterior of the retaining walls in each section are provided with a plurality of interconnected water conducting conduits to cool the gum when disposed between the walls and being used to take simultaneous impressions of the teeth between said retaining walls.

9. A dental impression tray for simultaneously taking the opposing bite with an impression of one dental arch, comprising a handle, an inclined buccal and a lingual retaining wall section respectively extending upwardly and downwardly of the central horizontal plane of the tray, a continuing connecting bar for said buccal and lingual wall sections, a reticulated member retained intermediate the retaining walls in the horizontal plane thereof, and means on each side of one of the sections for clasping the reticulated member.

10. A dental impression tray for obtaining the true relationship of opposing teeth in the dental arch by the use of a hydrocolloid, comprising a plurality of disconnectible complementary halves each half being flush with respect to each other, a perforated buccal and a lingual retaining wall, a bar interconnecting said walls, a reticulated member retained by said halves intermediate the retaining walls for holding a plastic material on the top and bottom thereof, and means on each side of one of the sections for clasping the halves together to form a tight fit to retain said reticulated member in a taut condition.

11. A dental impression tray for taking the opposing bite simultaneously with an impression of one dental arch, comprising a disconnectible lower and an upper section of corresponding outline, each of said sections having a respective elongated member, a perforated buccal retaining wall extending from the member, a curved distal member in connection with the elongated member and a lingual member in connection with the distal member, said lingual member having an inclined perforated retaining wall, means on one of the sections to retain a reticulated member thereon extending across from the buccal to the lingual wall, a handle extending from the buccal retaining wall of each section, and means on one of the sections adapted to retain the sections together.

12. A tray for taking simultaneous dental impressions with an impressionable material, of one or more teeth of the upper and lower dental arch, comprising a handle, a perforated inclined upper and lower buccal retaining wall, a perforated upper and lower inclined lingual retaining wall, means interconnecting the buccal and lingual retaining walls forming an intermediate space between said walls, a reticulated member in said space intermediate said retaining walls for accommodating a hydrocolloid gum on the upper and lower surfaces thereof and means for fixing said reticulated member intermediate said walls, and a plurality of interconnected water conducting conduits disposed around said walls for cooling the material when disposed between the walls for taking impressions of the teeth between the retaining walls.

EDWIN H. GETZ.

REFERENCES CITED

The following references are of record in the file of this patent:

UNITED STATES PATENTS

| Number | Name | Date |
|---|---|---|
| 905,535 | Holmes | Dec. 1, 1908 |
| 1,979,493 | Salvio | Nov. 6, 1934 |
| 2,036,735 | Welker | Apr. 7, 1936 |

FOREIGN PATENTS

| Number | Country | Date |
|---|---|---|
| 377,984 | Great Britain | Aug. 2, 1932 |
| 784,672 | France | Jan. 25, 1935 |